United States Patent
Chen et al.

(10) Patent No.: US 9,760,206 B2
(45) Date of Patent: Sep. 12, 2017

(54) SELF-CAPACITIVE TOUCH PANEL STRUCTURE, IN-CELL TOUCH PANEL, AND LIQUID CRYSTAL DISPLAY

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Gui Chen, Guangdong (CN); Jingfeng Xue, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

(*) Notice: Subject to any disclaimer, the term of this patent is extended or adjusted under 35 U.S.C. 154(b) by 31 days.

(21) Appl. No.: 14/759,281

(22) PCT Filed: Apr. 27, 2015

(86) PCT No.: PCT/CN2015/077510
§ 371 (c)(1),
(2) Date: Jul. 6, 2015

(87) PCT Pub. No.: WO2016/155064
PCT Pub. Date: Oct. 6, 2016

(65) Prior Publication Data
US 2016/0313844 A1  Oct. 27, 2016

(30) Foreign Application Priority Data
Mar. 31, 2015 (CN) .......................... 2015 1 0148380

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04108* (2013.01); *G06F 2203/04111* (2013.01)

(58) Field of Classification Search
CPC ........ G06F 3/041; G06F 3/0412; G06F 3/044; G06F 2203/04104; G06F 2203/04108;
(Continued)

(56) References Cited

U.S. PATENT DOCUMENTS

2006/0203403 A1* 9/2006 Schediwy ............... G06F 3/044
361/56
2009/0160346 A1* 6/2009 Lee ........................ G09G 3/20
315/169.1
(Continued)

*Primary Examiner* — Nathan Danielsen
(74) *Attorney, Agent, or Firm* — Andrew C. Cheng

(57) ABSTRACT

A self-capacitive touch panel structure includes a touch detection chip and multiple self-capacitance electrodes which are isolated with each other and arranged as a matrix. Each self-capacitance electrode is connected with the touch detection chip through a connection line, each self-capacitance electrode is connected with a corresponding connection line through at least one via hole. Wherein, for a same column of the multiple self-capacitance electrodes and according to a sequence of gradually far away from the touch detection chip, a cross-sectional area of a connection line connected with a following self-capacitance electrode is larger than a cross-sectional area of a connection line connected with a previous self-capacitance electrode such that resistance values of the connection lines connected between the self-capacitance electrodes and the touch detection chip are approximately equal. An in-cell touch panel and a liquid crystal display including above structure are also disclosed.

11 Claims, 3 Drawing Sheets

(58) Field of Classification Search
CPC .......... G06F 2203/04111; G09G 3/36–3/3696; G09G 2300/0421; G09G 2300/0426
See application file for complete search history.

(56) References Cited

U.S. PATENT DOCUMENTS

2011/0304787 A1\* 12/2011 Wang ................ G02F 1/134309
   349/33
2013/0181942 A1\* 7/2013 Bulea ...................... G06F 3/044
   345/174
2013/0307817 A1\* 11/2013 Kim ........................ G06F 3/044
   345/174

\* cited by examiner

SELF-CAPACITIVE TOUCH PANEL STRUCTURE, IN-CELL TOUCH PANEL, AND LIQUID CRYSTAL DISPLAY

BACKGROUND OF THE INVENTION

1. Field of the Invention

The present invention relates to a touch display technology, and more particular to a self-capacitive touch panel structure, an in-cell touch panel, and a liquid crystal display.

2. Description of Related Art

A touch panel as an input medium is the most simple and convenient human-computer interaction method. Therefore, the touch panel is more widely applied to a variety of electronic products. Based on different operation principles and interfaces for transmitting information, touch panel products can divide into four types: an infrared touch panel, a capacitive touch panel, a resistive touch panel and a surface acoustic wave touch panel. Wherein, the capacitive touch panel becomes the mainstream of touch panel technology because a long life, high transmittance, capable of supporting multiple touches, etc. The capacitive touch panel includes a surface capacitive type and a projected capacitive type. The projected capacitive type can be divided into a self-capacitive type and a mutual capacitive type. The self-capacitive touch panel structure, due to higher touch sensing accuracy and signal to noise ratio are favored by major panel manufacturers.

Currently, the self-capacitive touch panel structure utilizes a self-capacitance principle to detect a touch location of a finger. Specifically, multiple self-capacitance electrodes which are disposed at a same layer and isolated with each other are disposed in the touch panel structure. When a human body does not contact with the touch panel, a capacitance applied on each self-capacitance electrode is a fixed value. When a human body contact with the touch panel, a capacitance applied on a self-capacitance electrode which is corresponding to a touch location is the fixed value adding a human capacitance. A touch detection chip can determine the touch location in a touch time interval through detecting a capacitance change of each self-capacitance electrode.

FIG. 1 is a schematic diagram of a self-capacitive touch panel structure according to the conventional art. As shown in FIG. 1, the self-capacitive touch panel includes M rows and columns self-capacitance electrodes $R_{xy}$ ($R_{11}$~$R_{M1}$~$R_{1N}$~$R_{MN}$), and a touch detection chip 1. Each self-capacitance electrode $R_{xy}$ utilizes a single connection line $L_{yx}$ to connect with the touch detection chip 1. Specifically, the self capacitance electrodes $R_{xy}$ and the connection lines $L_{yx}$ are disposed at different layers, and each self-capacitance electrode $R_{xy}$ utilizes a via hole 2 to electrically connect with a corresponding connection line $L_{yx}$. That is, each column of the self capacitance electrodes $R_{1y}$~$R_{My}$ is sequentially connected with a group of the connection lines $L_{y1}$~$L_{yM}$ in order.

As sown in FIG. 1, from a bottom side to a top side, the first column of the self capacitance electrodes $R_{11}$~$R_{M1}$ are respectively corresponded to a group of the connection lines $L_{11}$~$L_{1M}$ which are from a left side to a right side. Each connection line $L_{1x}$ is connected with a corresponding self-capacitance electrode $R_{x1}$, and each connection line $L_{1x}$ is disconnected with other self-capacitance electrodes in order to realize an independent control of each self-capacitance electrode $R_{x1}$. That is, each self-capacitance electrode $R_{x1}$ connected with the connection line $L_{1x}$ is not connected with previous self-capacitance electrodes $R_{11}$~$R_{(x-1)1}$. After the connection line $L_{1x}$ is connected with the corresponding self-capacitance $R_{x1}$, the connection line $L_{1x}$ does not connect with following self-capacitance electrodes $R_{(x+1)1}$~$R_{M1}$.

Specifically, the first self-capacitance electrode $R_{11}$ of the self-capacitance electrodes $R_{11}$~$R_{M1}$ is connected with the touch detection chip 1 through the first connection line $L_{11}$ of the group of the connection lines $L_{11}$~$L_{1M}$, the second self-capacitance electrode $R_{21}$ of the self-capacitance electrodes $R_{11}$~$R_{M1}$ is connected with the touch detection chip 1 through the second connection line $L_{12}$ of the group of the connection lines $L_{11}$~$L_{1M}$, and so on, the Mth self-capacitance electrode $R_{M1}$ is connected with the touch detection chip 1 through the Mth connection line $L_{1M}$. Wherein, in the above symbols, x=1, 2, 3 . . . , M; y=1, 2, 3 . . . , N.

In the structure of the self-capacitive touch panel described above, because each column of the self-capacitance electrodes $R_{1y}$~$R_{My}$ is sequentially connected with a group of the connection lines $L_{y1}$~$L_{yM}$ in order. For the same column of the self-capacitance electrodes $R_{1y}$~$R_{My}$, lengths of the group of the connection lines $L_{y1}$~$L_{yM}$ corresponding to the column are increased gradually. The self-capacitance electrode $R_{My}$ farther away from the touch detection chip 1, the corresponding resistance value is larger. Finally, for the display situation of entire structure of the touch panel, resistance values of the connection lines $L_{yx}$ at different areas are unbalance so as to affect the sensitivity of the touch panel and the display effect of the product.

SUMMARY OF THE INVENTION

In view of the deficiencies of the conventional art, the present invention provides a self-capacitive touch structure. Through improving the connection lines of the self-capacitance electrodes, resistance values of connection lines at different areas of the touch panel are more balance in order to increase the sensitivity of the touch panel and the display effect of the product.

In order to achieve the above purpose, a technology solution adopted by the present invention is: a self-capacitive touch panel structure, comprising: a touch detection chip; and multiple self-capacitance electrodes which are isolated with each other and arranged as a matrix, each self-capacitance electrode is connected with the touch detection chip through a connection line, each self-capacitance electrode is connected with a corresponding connection line through at least one via hole; wherein, for a same column of the multiple self-capacitance electrodes and according to a sequence of gradually far away from the touch detection chip, a cross-sectional area of a connection line connected with a following self-capacitance electrode is larger than a cross-sectional area of a connection line connected with a previous self-capacitance electrode such that resistance values of the connection lines connected between the self-capacitance electrodes and the touch detection chip are approximately equal.

Wherein, each connection line is composed of multiple conduction lines have a same specification, wherein, a connection line connected with a following self-capacitance electrode includes more conduction lines comparing to a connection line connected with a previous self-capacitance electrode.

Wherein, each connection line is composed of a single conduction line, wherein, a cross-sectional area of a conduction line connected with a following self-capacitance electrode is larger than a cross-sectional area of a conduction line connected with a previous self-capacitance electrode.

Wherein, the same column of the multiple self-capacitance electrodes are divided into multiple groups according to a sequence of gradually far away from the touch detection chip, each cross-sectional area of connection lines connected with a following group of the self-capacitance electrodes is larger than each cross-sectional area of connection lines connected with a previous group of the self-capacitance electrodes, besides, for a same group of the self-capacitance electrodes, connection lines having a same specification are utilized.

Wherein, the self-capacitance electrodes and the connection lines are disposed at different layers, and materials of each self-capacitance electrode and each connection line are indium tin oxide (ITO).

Wherein, a shape of each self-capacitance electrode is rectangular.

Wherein, the at least one via hole includes 3 to 5 via holes.

Another embodiment of the present invention provides: an in-cell touch panel, comprising: an upper substrate; a lower substrate; a liquid crystal layer disposed between the upper substrate and the lower substrate; and a self-capacitive touch panel structure described above, wherein, the self-capacitance electrodes and the connection lines are disposed on a side of the upper substrate facing toward the lower substrate.

Another embodiment of the present invention provides: a liquid crystal display includes a liquid crystal panel and a backlight module, wherein, the liquid crystal panel is disposed oppositely to the backlight module, the backlight module provides a display light source to the liquid crystal panel so that the liquid crystal panel can display am image. Wherein, the liquid crystal panel adopts the in-cell touch panel described above.

The self-capacitance touch panel structure provided by the embodiments of the present invention, for the same column of the self-capacitance electrodes, according to a sequence of gradually far away from the touch detection chip, a cross-sectional area of the connection line connected with a following self-capacitance electrode is greater than a cross-sectional area of the connection line connected with a previous self-capacitance electrode such that resistance values of the connection lines connected between the self-capacitance electrodes and the touch detection chip are approximately equal. Accordingly, resistance values of connection lines at different areas of the touch panel are more balance in order to increase the sensitivity of the touch panel and the display effect of the product.

DETAILED DESCRIPTION OF THE PREFERRED EMBODIMENT

As described above, the purpose of the present invention is to improve the self-capacitive touch panel of the conventional art that lengths of a group of connection lines connected with a same column of the self-capacitance electrodes are increased gradually such that the resistance values are unbalance so as to decrease the sensitivity of the touch panel. Accordingly, a self-capacitive touch panel structure is disclosed.

The self-capacitive touch panel structure includes a touch detection chip and multiple self-capacitance electrodes which are isolated with each other and are arranged as a matrix. Each self-capacitance electrode is connected with the touch detection chip through a connection line. Each self-capacitance electrode is electrically connected with a corresponding connection line through at least one via hole. Wherein, for the same column of the self-capacitance electrodes, according to a sequence of gradually far away from the touch detection chip, a cross-sectional area of the connection line connected with a following self-capacitance electrode is larger than a cross-sectional area of the connection line connected with a previous self-capacitance electrode such that resistance values of the connection lines connected between the self-capacitance electrodes and the touch detection chip are approximately equal.

In the self-capacitive touch panel structure, through improving the structure of the connection lines such that resistance values of connection lines between the self-capacitance electrodes and the touch detection chip are almost equal. The resistance values of the connection lines at different areas are more balance in order to improve the sensitivity of the touch panel and the display quality of the product.

The following content combines figures and embodiments for detail description of the present invention.

Embodiment 1

Figure 1:
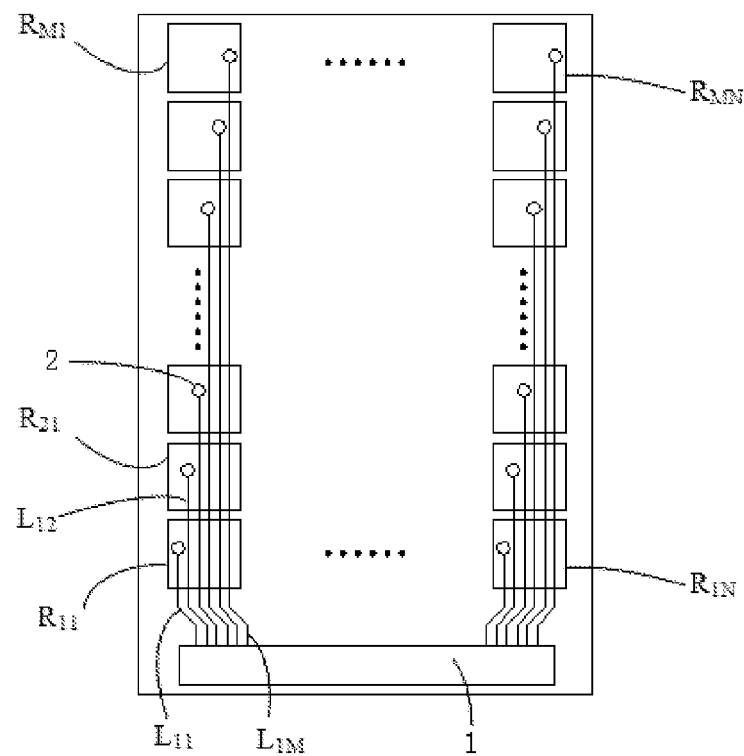
FIG. 1 is a schematic diagram of a self-capacitive touch panel structure according to the conventional art.
Figure 2:
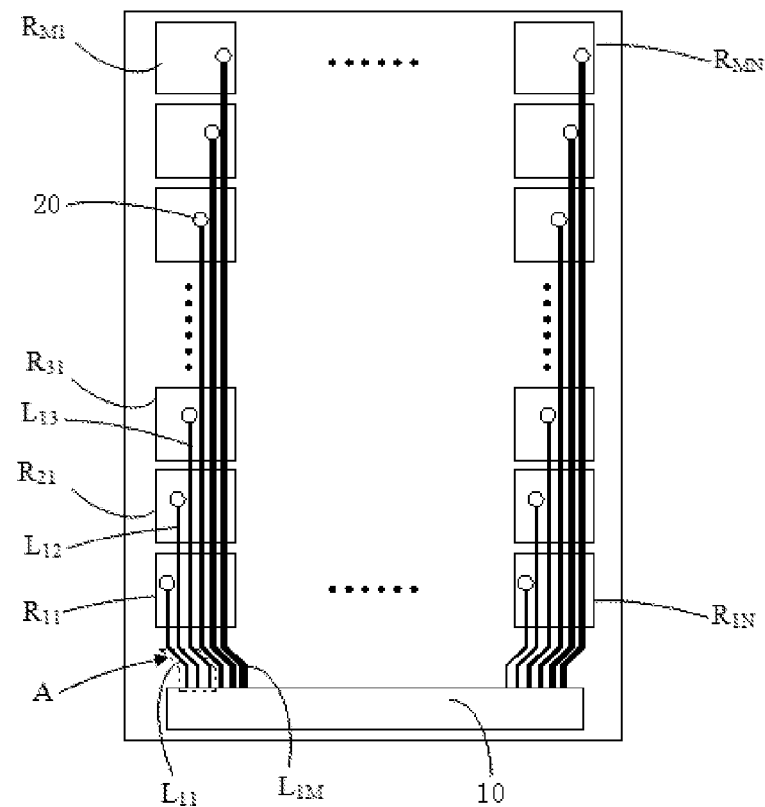
FIG. 2 is schematic diagram of a self-capacitive touch panel structure according to a first embodiment of the present invention.

The present embodiment provides a self-capacitive touch panel structure. As shown in FIG. 2, the self-capacitive touch panel structure includes M rows and N columns self-capacitance electrodes $R_{xy}$ ($R_{11} \sim R_{M1} \sim R_{1N} \sim R_{MN}$) which are isolated with each other and a touch detection chip 10. Each self-capacitance electrode $R_{xy}$ is connected with the touch detection chip 10 through a single connection line $L_{yx}$.

Specifically, in the present embodiment, a shape of each self-capacitance electrode $R_{xy}$ is rectangular. The self-capacitance electrode $R_{xy}$ and the connection line $L_{yx}$ are disposed at different layers. Materials of the self-capacitance electrode $R_{xy}$ and the connection line $L_{yx}$ are both indium tin oxide (ITO). The self-capacitance electrode $R_{xy}$ is electrically connected with a corresponding connection line $L_{yx}$ through at least one via hole 20. In the present invention, the number of the at least one via hole 20 is one. In another embodiment, in order to increase the electric connection performance between the self-capacitance electrode $R_{xy}$ and the corresponding connection line $L_{yx}$. The number of the at least one via hole 20 maybe multiple, preferably, 3~5 via holes. Wherein, in the above symbols, x=1, 2, 3 . . . , M, and y=1, 2, 3 . . . , N.

Furthermore, in the structure of the self-capacitive touch panel of the present embodiment, as shown in FIG. 2, the touch detection chip 10 is located at a bottom side of the multiple self-capacitance electrodes $R_{xy}$. Each column of the self-capacitance electrodes includes a 1st self-capacitance electrode to an Mth self-capacitance electrode $R_{1y} \sim R_{My}$ arranged from a bottom to a top. A group of connection lines connected with the column of the self-capacitance electrodes $R_{1y}$~$R_{My}$ includes a 1st to an Mth connection lines $L_{y1}$~$L_{yM}$ arranged from a left to a right. Wherein, each column of the self-capacitance electrodes $R_{1y}$~$R_{My}$ is sequentially connected with a group of the connection lines $L_{y1}$~$L_{yM}$.

As sown in FIG. 2, from a bottom side to a top side, a first column of the self capacitance electrodes $R_{11}$~$R_{M1}$ are respectively corresponded to a group of the connection lines $L_{11}$~$L_{1M}$ which are arranged in a sequence from a left side to a right side. Each connection line $L_{1x}$ is connected with a corresponding self-capacitance electrode $R_{x1}$, and each connection line $L_{x1}$ is disconnected with other self-capacitance electrodes in order to realize an independent control of each self-capacitance electrode $R_{x1}$. That is, each self-capacitance electrode $R_{x1}$ connected with the connection line $L_{1x}$ is not connected with previous self-capacitance electrodes $R_{11}$~$R_{(x-1)1}$. After the connection line $L_{1x}$ is connected with the corresponding self-capacitance $R_{x1}$, the connection line $L_{1x}$ does not connect with following self-capacitance electrodes $R_{(x+1)1}$~$R_{M1}$.

Specifically, the first self-capacitance electrode $R_{11}$ of the column of the self-capacitance electrodes $R_{11}$~$R_{M1}$ is connected with the touch detection chip 10 through the first connection line $L_{11}$ of the group of the connection lines $L_{11}$~$L_{1M}$, the second self-capacitance electrode $R_{21}$ of the column of the self-capacitance electrodes $R_{11}$~$R_{M1}$ is connected with the touch detection chip 10 through the second connection line $L_{12}$ of the group of the connection lines $L_{11}$~$L_{1M}$, the third self-capacitance electrode $R_{31}$ of the column of the self-capacitance electrodes $R_{11}$~$R_{M1}$ is connected with the touch detection chip 10 through the third connection line $L_{13}$ of the group of the connection lines $L_{11}$~$L_{1M}$, and so on. The Mth self-capacitance electrode $R_{M1}$ is connected with the touch detection chip 10 through the Mth connection line $L_{1M}$. Wherein, in the above symbols, x=1, 2, 3 . . . , M; y=1, 2, 3 . . . , N.

Figure 3:
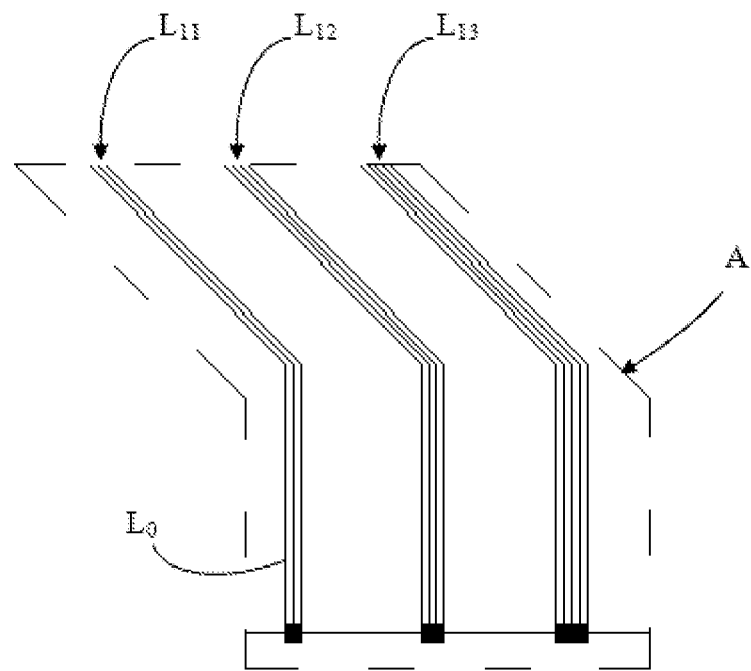
FIG. 3 is schematic diagram of a kind of connection line according to a first embodiment of the present invention.

Wherein, for the same column of the self-capacitance electrodes $R_{11}$~$R_{M1}$, according to a sequence of far away from the touch detection chip 10, a cross-sectional area of the connection line connected with a following self-capacitance electrode $R_{(+1)1}$ is larger than a cross-sectional area of the connection line connected with a previous self-capacitance electrode $R_{x1}$ such that resistance values of the connection lines connected between the self-capacitance electrodes and the touch detection chip are approximately equal. Specifically, the above description can be realized by the following methods:

The first method: each connection line includes multiple conduction lines having a same specification. Wherein, a connection line connected with a following self-capacitance electrode includes more conduction lines comparing to a connection line connected with a previous self-capacitance electrode. A partial enlarged diagram of an "A" portion in FIG. 2 is shown in FIG. 3. FIG. 3 only exemplarily shows connection lines $L_{11}$, $L_{12}$ and $L_{13}$. The connection line $L_{11}$ includes three conduction lines $L_0$ having the same specification (the cross-sectional areas are the same). The connection line $L_{12}$ includes four conduction lines $L_0$ having the same specification. The connection line $L_{13}$ includes five conduction lines $L_0$ having the same specification, and so on. The connection line $L_{1M}$ of the Mth self-capacitance electrode $R_{M1}$ includes the greatest number of the conduction lines $L_0$ having the same specification. Accordingly, the connection line farther away from the touch detection chip 10 has a larger cross-sectional area such that resistance values of the connection lines between the self-capacitance electrodes and the touch detection chip 10 are approximately equal.

Figure 4:
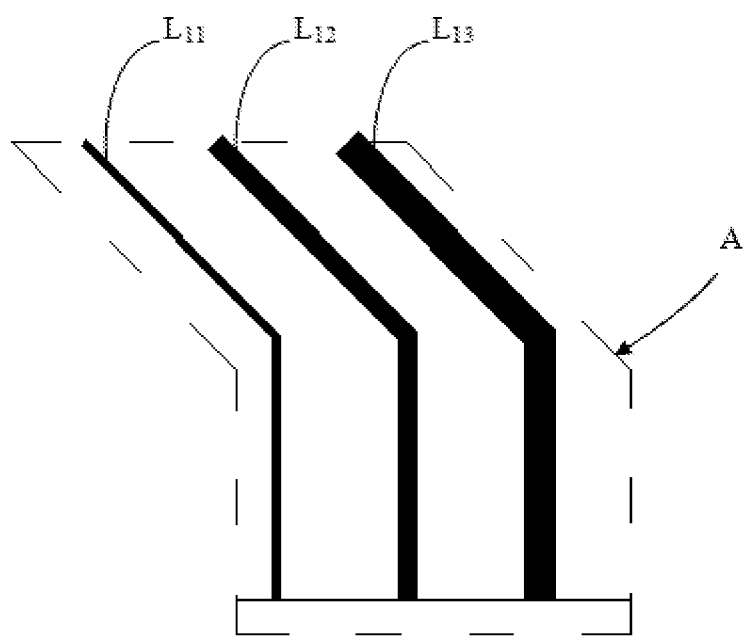
FIG. 4 is schematic diagram of another kind of connection lines according to a first embodiment of the present invention.

The second method: each connection line is composed of a single conduction line. Wherein, a cross-sectional area of a conduction line connected with a following self-capacitance electrode is larger than a cross-sectional area of a conduction line connected with a previous self-capacitance electrode. At this time, a partial enlarged diagram of an "A" portion in FIG. 2 is shown in FIG. 4. FIG. 4 only exemplarily shows connection lines $L_{11}$, $L_{12}$ and $L_{13}$. As shown in FIG. 4, the connection lines $L_{11}$, $L_{12}$ and $L_{13}$ are respectively composed of one conduction line having a different specification (the cross-sectional areas are different). Besides, cross-sectional areas of $L_{11}$, $L_{12}$ and $L_{13}$ are gradually increased, and so on. The connection line $L_{1M}$ connected with the Mth self-capacitance electrode $R_{M1}$ is composed of a conduction line having a largest cross-sectional area. Accordingly, the connection line of the self-capacitance electrode farther away from the touch detection chip 10 has larger cross-sectional area such that resistance values of the connection lines between the self-capacitance electrodes and the touch detection chip are approximately equal.

Accordingly, through improving the structure of the connection lines such that resistance values of connection lines between the self-capacitance electrodes and the touch detection chip are almost equal. The resistance values of the connection lines at different areas are more balance in order to improve the sensitivity of the touch panel and the display quality of the product.

Embodiment 2

Because the manufacturing technology for a touch panel is very complex and connection lines in the touch panel are smaller. Therefore, when the specifications of the connection lines L connected between the self-capacitance electrodes $R_{xy}$ and the touch detection chip are too many, the difficulty of the manufacturing technology is increased. Accordingly, the present embodiment provides another self-capacitive touch panel structure.

Figure 5:
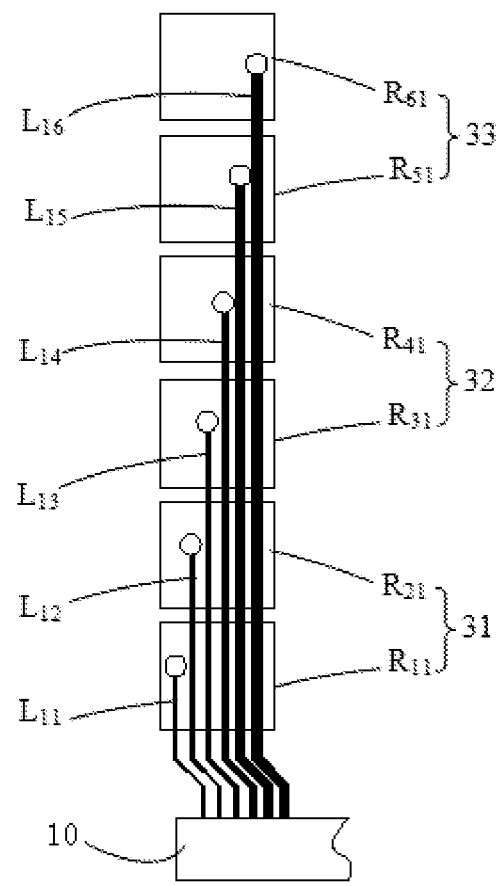
FIG. 5 is a schematic diagram of a self-capacitive touch panel structure according to a second embodiment of the present invention.

The difference between the self-capacitive panel structure of the present embodiment and the first embodiment is: with reference to FIG. 5, FIG. 5 only exemplarily shows a first column and six self-capacitance electrodes $R_{11}$~$R_{61}$ at the first column. As shown in FIG. 5, in the present embodiment, the self-capacitance electrodes $R_{11}$~$R_{61}$ are divided into three groups according to a sequence of gradually far away from the touch detection chip 10. The first group 31 includes self-capacitance electrodes $R_{11}$ and $R_{21}$. The second group 32 includes self-capacitance electrodes $R_{31}$ and $R_{41}$. The third group 33 includes self-capacitance electrodes $R_{51}$ and $R_{61}$.

Wherein, each cross-sectional area of connection lines connected with a following group of the self-capacitance electrodes is greater than each cross-sectional area of connection lines connected with a previous group of the self-capacitance electrodes. For example, each cross-sectional area of the connection lines $L_{13}$ and $L_{14}$ connected with the second group of the self-capacitance electrodes $R_{31}$ and $R_{41}$ is larger than each cross-sectional area of the connection lines $L_{11}$ and $L_{12}$ connected with the first group of the self-capacitance electrodes $R_{11}$ and $R_{21}$. Each cross-sectional area of the connection lines $L_{15}$ and $L_{16}$ connected with the third group of the self-capacitance electrodes $R_{51}$ and $R_{61}$ is larger than each cross-sectional area of the connection lines $L_{13}$ and $L_{14}$ connected with the second group of the self-capacitance electrodes $R_{31}$ and $R_{41}$. Besides, the connection lines $L_{11}$ and $L_{12}$ have a same specification (the same cross-sectional area); the connection lines $L_{13}$ and $L_{14}$ have a same specification (the same cross-sectional area); the connection lines $L_{15}$ and $L_{16}$ have a same specification (the same cross-sectional area). The above embodiment is only described for a specific example. A column of self-capacitance electrodes can be divided into more groups (not limited to three groups), and each group can include more self-capacitance electrodes (not limited to two electrodes).

Wherein, the methods to realize unequal cross-sectional areas of the connection lines can refer to the methods in the first embodiment. Accordingly, the same column of the self-capacitance electrodes are divided into multiple groups according to a sequence of far away from the touch detection chip, each cross-sectional area of the connection lines connected with a following group of the self-capacitance electrodes is larger than each cross-sectional area of the connection lines connected with a previous group of the self-capacitance electrodes. Besides, the same group of the self-capacitance electrodes utilizes the connection lines having the same specification in order to improve the resistance unbalance problem of the connection lines. Although comparing to the first embodiment, the degree of balance for improving the resistance value of the connection lines at different areas is worse, however, the manufacturing technology for the second embodiment is easily for realizing.

Embodiment 3

Figure 6:
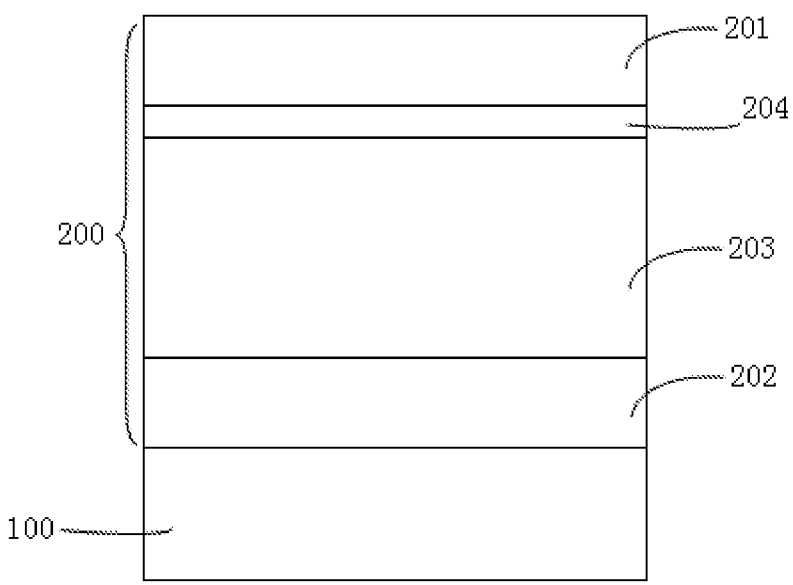
FIG. 6 is an in-cell touch panel and a liquid crystal display according to a third embodiment of the present invention.

As shown in FIG. 6, the present embodiment provides an in-cell touch panel 200. The touch panel includes an upper substrate 201, a lower substrate 202 and a liquid crystal layer 203 disposed between the upper substrate 201 and the lower substrate 202. Furthermore, the in-cell touch panel 200 also includes the self-capacitive touch panel structure 204 provided at embodiment 1 or embodiment 2. Wherein, the self-capacitance electrodes and the connection lines in the self-capacitive touch panel structure 204 are all disposed on a side of the upper substrate 201 facing toward the lower substrate 202.

As shown in FIG. 6, the present embodiment also provides a liquid crystal display. The liquid crystal display includes the in-cell touch panel 200 and a backlight module 100. The in-cell touch panel 200 and the backlight module 100 are disposed oppositely. The backlight module 100 provides display light to the in-cell touch panel 200 so that the in-cell touch panel 200 can display an image.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A self-capacitive touch panel structure, comprising:
   a touch detection chip; and
   multiple self-capacitance electrodes which are isolated with each other and arranged as a matrix, each self-capacitance electrode is connected with the touch detection chip through a connection line, each self-capacitance electrode is connected with a corresponding connection line through at least one via hole;
   wherein, a same column of the multiple self-capacitance electrodes is divided into multiple groups including a first group and a second group according to a sequence of gradually far away from the touch detection chip, each of the first group and the second group includes two self-capacitance electrodes, each cross-sectional area of the two connection lines respectively connected with the two self-capacitance electrodes in the second group is larger than each cross-sectional area of the two connection lines respectively connected with the two self-capacitance electrodes in the first group, the cross-sectional areas of the two connection lines connected with the self-capacitance electrodes of the first group are the same, and the cross-sectional areas of the two connection lines connected with the self-capacitance electrodes of the second group are the same.

2. The self-capacitive touch panel structure according to claim 1, wherein, the self-capacitance electrodes and the connection lines are disposed at different layers, and materials of each self-capacitance electrode and each connection line are indium tin oxide (ITO).

3. The self-capacitive touch panel structure according to claim 1, wherein, a shape of each self-capacitance electrode is rectangular.

4. The self-capacitive touch panel structure according to claim 1, wherein, the at least one via hole includes 3 to 5 via holes.

5. An in-cell touch panel, comprising:
   an upper substrate;
   a lower substrate;
   a liquid crystal layer disposed between the upper substrate and the lower substrate; and
   a self-capacitive touch panel structure, including:
     a touch detection chip; and
     multiple self-capacitance electrodes which are isolated with each other and arranged as a matrix, each self-capacitance electrode is connected with the touch detection chip through a connection line, each self-capacitance electrode is connected with a corresponding connection line through at least one via hole;
   wherein, the self-capacitance electrodes and the connection lines are disposed on a side the upper substrate facing toward the lower substrate; and
   wherein, a same column of the multiple self-capacitance electrodes are divided into multiple groups including a first group and a second group according to a sequence of gradually far away from the touch detection chip, each of the first group and the second group includes two self-capacitance electrodes, each cross-sectional area of the two connection lines respectively connected with the two self-capacitance electrodes in the second group is larger than each cross-sectional area of the two connection lines respectively connected with the two self-capacitance electrodes in the first group, the cross-sectional areas of the two connection lines connected with the self-capacitance electrodes of the first group are the same, and the cross-sectional areas of the two connection lines connected with the self-capacitance electrodes of the second group are the same.

6. The in-cell touch panel according to claim 5, wherein, the self-capacitance electrodes and the connection lines are disposed at different layers, and materials of each self-capacitance electrode and each connection line are indium tin oxide (ITO).

7. The in-cell touch panel according to claim 5, wherein, a shape of each self-capacitance electrode is rectangular.

8. The in-cell touch panel according to claim 5, wherein, the at least one via hole includes 3 to 5 via holes.

9. A liquid crystal display, comprising:
a liquid crystal panel, including:
an upper substrate;
a lower substrate;
a liquid crystal layer disposed between the upper substrate and the lower substrate; and
a self-capacitive touch panel structure, including:
a touch detection chip; and
multiple self-capacitance electrodes which are isolated with each other and arranged as a matrix, each self-capacitance electrode is connected with the touch detection chip through a connection line, each self-capacitance electrode is connected with a corresponding connection line through at least one via hole;
wherein, the self-capacitance electrodes and the connection lines are disposed on a side of the upper substrate facing toward the lower substrate; and
wherein, a same column of the multiple self-capacitance electrodes are divided into multiple groups including a first group and a second group according to a sequence of gradually far away from the touch detection chip, each of the first group and the second group includes two self-capacitance electrodes, each cross-sectional area of two connection lines respectively connected with the two self-capacitance electrodes in the second group is larger than each cross-sectional area of two connection lines respectively connected with the two self-capacitance electrodes in the first group, besides, the cross-sectional areas of the two connection lines connected with the self-capacitance electrodes of the first group are the same, and the cross-sectional areas of the two connection lines connected with the self-capacitance electrodes of the second group are the same; and
a backlight module disposed oppositely to the liquid crystal panel, and providing display light to the liquid crystal panel such that the liquid crystal panel can display an image.

10. The liquid crystal display according to claim 9, wherein, the self-capacitance electrodes and the connection lines are disposed at different layers, and materials of each self-capacitance electrode and each connection line are indium tin oxide (ITO).

11. The liquid crystal display according to claim 9, wherein, a shape of each self-capacitance electrode is rectangular and the at least one via hole includes 3 to 5 via holes.

* * * * *